United States Patent [19]

Cehovic et al.

[11] 3,856,776
[45] Dec. 24, 1974

[54] DERIVATIVES OF CYCLO ADENOSINE-3 -,5 -PHOSPHORIC ACID AND THEIR PREPARATION

[75] Inventors: Georges Cehovic, Val de Marne, France; Albert Gabbai; Ilan Marcus; Theodore Posternak, all of Geneva, Switzerland

[73] Assignee: Agence Nationale De Valorisation De La Recherche, Tour Aurore, Paris-Defense, Courhevoie, Hauts de Seine, France

[22] Filed: Oct. 12, 1970

[21] Appl. No.: 80,223

[30] Foreign Application Priority Data
Oct. 10, 1969  France .............................. 69.34747
Oct. 2, 1970  France .............................. 70.35682

[52] U.S. Cl. .......................... 260/211.5 R, 424/180
[51] Int. Cl. ............................................. C07d 51/54
[58] Field of Search .............................. 260/211.5 R

[56] References Cited
UNITED STATES PATENTS

| | | | |
|---|---|---|---|
| 3,225,029 | 12/1965 | Yamaoka | 260/211.5 R |
| 3,300,479 | 1/1967 | Hanze | 260/211.5 R |
| 3,323,994 | 6/1967 | Grotsch | 260/211.5 R |
| 3,431,252 | 3/1969 | Walton | 260/211.5 R |
| 3,627,753 | 12/1971 | Posternak et al. | 260/211.5 R |
| 3,712,885 | 1/1973 | Weimann et al. | 260/211.5 R |

OTHER PUBLICATIONS

Posternak et al., "Biochim. Biophys. Acta", 1962, pp. 558–560.

Smith et al., "Jour. Amer. Chem. Soc.", Vol. 83, 1961, pp. 698–706.

Holmes et al., "Jour. Amer. Chem. Soc.", Vol. 86, 1964, pp. 1242–1245.

Levine et al., "Chem. Abst.", Vol. 67, 1967, p. 98441a.

*Primary Examiner*—Johnnie R. Brown
*Attorney, Agent, or Firm*—Stevens, Davis, Miller & Mosher

[57] ABSTRACT

Adenosine-3'-5'-monophosphoric acid derivatives and the 2'-O-butyryl derivative of iso-adenosine-3',5'-monophosphoric acid, and their methods of production are described. The compounds have utility in connection with hormonal action. Allied compounds are also described.

16 Claims, No Drawings

DERIVATIVES OF CYCLO ADENOSINE-3',5'-PHOSPHORIC ACID AND THEIR PREPARATION

The present invention relates to nucleotides and more particularly to derivatives of cyclo adenosine-3',5'-phosphoric acid and one of its isomers.

Cyclo adenosine-3',5'-phosphoric acid has the formula

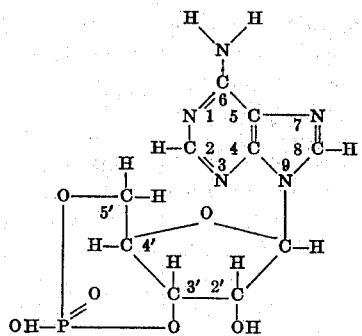

the qualification "cyclo" being used to indicate that the atoms of the phosphoric group form a ring with the ribosic group.

This compound is made in the cells of animal organisms by subjecting adenosine-5' triphosphoric acid to the action of the enzyme adenyl cyclase.

It is believed that a large number of hormones utilize adenosine-3',5'-phosphoric acid (referred as "cyclo AMP.") as a chemical messenger for self activation, and especially as second messenger according to the terminology of Sutherland et al. The biological activity of cyclo AMP may conveniently be seen by various tests in vitro, notably that of the dilation of melanophores in the skin of the lizard *Anolis Carolinensis;* that of the dispersion of the melanophores in the skin of a frog (*Rana Pipiens*) and that of the increase in the quantity of thyrotrophic hormone excreted by the rat hypophysis. The cyclo AMP increases the production of corticosteroids (Haynes, Koritz, Peron, J.biol. Chem. 234,1421, (1959)). The dibutyryl derivatives of cyclo AMP have the same effect as, and may replace ACTH, and in the whole animal may augment the plasmatic level of corticosteroids (Imura et al, Endocrinology 76,933 1965).

A compound having similar properties is the isomer in which the ribose nucleus, instead of being attached by its 1' carbon atom to the 9 position on the purine ring, is, by that atom, attached to the nitrogen atom in the 3 position; the double bonds in the purine nucleus being displaced in consquence. It is convenient to name this compound "iso-cyclo-AMP".

The object of the present invention is to provide new derivatives of cyclo-AMP and iso-cyclo-AmP which show similar biological activities but more intensely and/or more selectively.

The new compounds are

A. Derivatives of adenosine-3',5'-monophosphoric acid of the formula

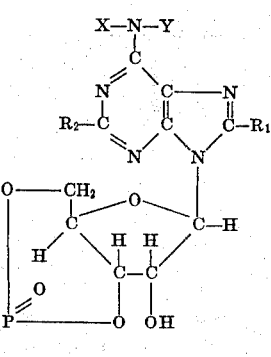

wherein one of the symbols X and Y represent an hydrogen atom or alkyl group and the other represents an alkyl group, $R_1$ and $R_2$ each being hydrogen, or X and Y are each hydrogen, $R_1$ is hydrogen or bromine or a sulfhydryl, hydroxyl, methylthio or amino group and $R_2$ is hydrogen or an amino group.

B. The compound 2-O-butyryl iso adenosine-3',5'-monophosphoric acid.

C. The salts formed by salification of the hydroxyl group linked to the phosphorus atom.

The invention is concerned especially with said derivatives which, in position 6, carry a radical $-NHCH_3$, $-N(CH_3)_2$, $-NH-n.C_4H_9$ or $-NH-t.C_4H_9$ as well as those in which $R_2=H$, and $R_1=Br$, SH $ScH_3$, OH or $NH_2$ and that for which $R_2=NH_2$ and $R_1=H$, X and Y being H.

The new derivatives of cyclo AMP alkylated in 6-position may be made from adenosine-5'-monophosphoric acid monoalkylated or dialkylated on the 6-position nitrogen by reacting with p-nitrophenol in the presence of di-cyclohexyl carbo di-imide ($C_6H_{11}-N=C=N-C_6H_{11}$) and treating the esters obtained, preferably in the form of their trimethylammonium salts, with potassium tertiobutoxide.

The monoalkyl and dialkyl derivatives of adenosine-5'-monophosphoric acid, which are novel and form part of the invention, may be obtained by reacting a 6-halo, particularly a 6-chloro, 9-(ribol-β-furanosyl-2',3'-isopropylidene)-purine, with the appropriate mono-or dialkylamine and subjecting the adenosine derivative obtained to a phosphorylation, preferably by the action of phosphorus oxychloride in methyl phosphate.

The invention further comprises a new process for the production of cyclic nucleotides from 5'-nucleotides which is related to that of both, Drummond and Khorane, J. Amer. Chem. Soc. 83 698 (1961); this process consists in heating to boiling, under reflux, a salt of a 5'-nucleotide with dicyclohexyl-carbo-di-imide (DCHC) or di-(cyclohexylimino) methane, in the presence of anhydrous pyridine.

A feature of the invention is that one adds dimethyl formamide, which has a double effect; on the one hand the 5'-nucleotides dissolve more easily in the mixture and on the other hand the dimethyl formamide appears to promote the reaction. The dimethyl formamide is added in quantity sufficient to dissolve the 5'-nucleotide completely. For example an equal volume mixture of pyridine and dimethyl formamide may be used.

The process is simpler than the method of cyclising the p-nitrophenolic esters first mentioned. If affords lesser yields in the case of AMP carrying an amino group in 2-position, by reason of the formation of a byproduct labile in acid medium or in alkaline medium and which appears to an adenosine-$N^2$, 5'-phosphoric acid containing a phosphamidic linkage, which explains the lability. On treatment with caustic soda this compound regenerates the starting nucleotide, which can be isolated and recycled, which increases the total yield.

It is thus possible, from guanosine-5'-phosphoric acid (GMP) to prepare directly the cyclic GMP of which recent work has shown the presence in nature and biological action, qualitatively analogous to that of cyclo AMP; in some biological tests this cyclo GMP has an action even quantitatively superior to that of cyclo AMP.

The 2'-O-butyryl derivative of cyclo-iso-AMP may be prepared, according to the invention, by direct acylation of the acid, preferably in the form of its triethyl ammonium salt. The reaction may be carried out, in particular, with an excess of butyric anhydride in the presence of pyridine, at ambient temperature.

The new derivatives of cyclo AMP may be used in industry for the same purposes as cyclo AMP, notably for biochemical and pharmaceutical research.

The following, non-limitative, examples, in which the temperatures are in degrees centigrade, illustrate the preparation of the new derivatives:-

EXAMPLES 1-4 a. $N^6$-alkyl adenosine-5'-phosphoric acids ($N^6$-n-butyl-AMP)

The starting material is 9-ribo-β-furanosyl-2',3'-isopropylidene)-6-chloro-purine: this is prepared by the method of Hampton and Maguire, J. Amer. Chem. Soc. 83, 1961, page 150 and Zemlicka and Sorm, Czechoslovakia Patent No. 110944, 1964. A solution of 50 mg of this product in 1 ml of anhydrous n-butylamine is warmed for 15 hours at 80°C. The product is evaporated to dryness in vacuo, taken up in chloroform, evaporated to dryness in vacuo and this operation is repeated several times. The residue is then dried for 1 hour under a high vacuum and dissolved in 1 ml of absolute methanol; 0.5 g of silica gel "Merck"(0.05 to 0.20 mm) is introduced and evaporated to dryness. The solid is introduced at the top of a column of silica gel 155 mm in length and 8 mm in diameter. Elution is effected using a mixture of chloroform and methanol (90:10 by volume), fractions of 1 ml being collected. The 9-(ribo-β-furanosyl-2',3'-isopropylidene)-6-n-butyl amino purine is contained in fractions 7 to 13. There is obtained after evaporation to dryness, 37 mg of an amorphous, chromatographically homogenous substance (Rf 0.75 on a thin layer of silica in n-butanol saturated with water).

The foregoing product, 467 mg, dried under high vacuum for 2 hours at ordinary temperature, is dissolved in 3.3. ml of methyl phosphate. The temperature is maintained at 0°, 0.47 ml of phosphorus oxychloride is introduced and the mixture is allowed to stand for 5 to 6 hours. Excess reactant is destroyed by the addition of 20 g of crushed ice. After ½ hour's stirring the pH is adjusted to 1.5 by means of concentrated ammonia. The mixture is then warmed for 50–60 minutes at 80°–90° which permits the removal, by hydrolysis, of the isopropylidene group. The pH is brought to 7.0 by means of concentrated ammonia, stirring is effected for 10 minutes in the presence of 10 g of active animal black (obtained according to Hurst and Becking, Can. J. Biochem. Physiol. 41, 1963, page 469) and treated by washing with acid. The animal black recovered by filtration and washed by means of 100 ml water is treated with 400 ml of a mixture of concentrated ammonia, water and methanol (15:35:50 by volume) which permits elution of the absorbed nucleotide. The product is evaporated to dryness, taken up in water, and acidified to pH 2.0 by means of 0.5 M sulphuric acid. It is then concentrated to about 2 ml. After addition of alcohol, and then acetone, and standing at 0°, there is obtained 310 mg of crystalline $N^6$-n-butyl AMP. The analytically pure product melts at 155°–158° and shows itself homogeneous to chromatography.

b. Other derivatives of $N^6$ alkylated AMP have been prepared similarly. The following table shows some of the characteristics of the various products:

TABLE 1

| $N^6$-alkyl derivatives of AMP | | | | | | |
|---|---|---|---|---|---|---|
| Substituents on $N^6$ | m.pt | λmax (mµ) | εmax | $R_f$ in various solvents* | | |
| | | | | A | B | C |
| monoethyl | 184–185° | 268 | 16900 | 0.21 | 0.30 | 0.33 |
| dimethyl | 225–230° | 274 | 18400 | 0.30 | 0.37 | 0.61 |
| n-butyl | 155–158° | 266 | 14000 | 0.50 | — | 0.75 |
| t-butyl | — | 270 | 15200 | 0.51 | 0.66 | 0.75 |

*Solvents
A. alcohol: ammonium acetate 0.5M (5:2 by volume)
B. isopropanol: concentrated ammonia: water (6:3:1 by volume)
C. isopropanol: 1% ammonium sulphate (2:1 by volume)

EXAMPLES 5-8 a. $N^6$, $N^6$-dimethyl adenosine-3',5'-phosphoric acid ($N^6$-dimethyl cyclo AMP) and its salts $N^6$-dimethyl-adenosine-5'-phosphoric acid ($N^6$-dimethyl AMP) (150 mg) is dissolved in a mixture of 2.5 ml of dimethylformamide and 2.5 ml of anhydrous pyridine. There is added 0.112 ml of tri-n-butylamine, 556 mg of p-nitrophenol and 825 mg of dicyclohexyl carbodi-imide (DCHC). The nucleotide passes completely in solution after 5 to 10 minutes stirring. It is allowed to stand for 24 hours at ordinary temperature. By chromatography on paper (system A of Table 1) there is obtained, in approximately equal quantities, the p-nitrophenyl ester of the AMP derivative and of the corresponding symmetrical pyrophosphate. The mixture is evaporated to dryness under vacuum and the residue is taken up in 10 ml water. After filtration, it is extracted five times, each with 10 ml of ether to recover the p-nitrophenol and the excess DCHC. The aqueous solution is poured into a column (40 cm long and 2.8 cm in diameter) of DEAE-cellulose in the form of its bicarbonate. After washing the column with 500 ml of twice-distilled water elution is effected at different concentration levels by means of addition to the water of triethylammonium bicarbonate (0.1 M) (pH 7.5). A total of 3 litres of the mixture is employed.

Fractions of 20 ml are recovered. The p-nitrophenolic ester of $N^6$-dimethyl-AMP (yield 45 percent) is found in fractions 56–78; $\gamma$max = 274 m; $\epsilon$ max = 22000. By evaporation to dryness the trimethylammonium salt is obtained, which is dried for several hours under very low pressure, at ordinary temperature.

The trimethyl ammonium salt (107 mg) is dissolved in 4 ml of anhydrous dimethylsulphoxide. There is added 1 mg of a 1M solution of potassium tert. butoxide in anhydrous tert. butyl alcohol, which causes the formation of cyclic nucleotide with liberation of p-nitrophenate. At the end of 3 hours at ordinary temperature 2 g of Dowex 50 ($NH_4^+$ form) is stirred in and the product, after addition of 10 ml water, is filtered. The resin is then washed with 0.2 N ammonia until the elution of the cyclic nucleotide is complete. The ammonical solution is evaporated under vacuum and the product fractionated as indicated above on a column of DEAE cellulose. Fractions Nos. 58 to 82 contain the cyclic nucleotide. These are combined and evaporated to dryness. The product is taken up in methanol and again evaporated to dryness. It is then dissolved in 0.5 ml of anhydrous methanol, 2 ml of a 0.5 M solution of sodium perchlorate in anhydrous acetone is added and the precipitation of the sodium salt of the nucleotide is then completed by addition of 5 ml of anhydrous acetone. A yield of 39 mg of the product is obtained by centrifuging. It is washed in acetone.

From an aqueous concentrated solution of the sodium salt, the cyclic nucleotide may be precipitated in the form of its salts with heavy metals, for example as the silver salt by the addition of silver nitrate in slight excess. By decomposition of this salt, in aqueous suspension, by means of hydrogen sulphide, the free acid is obtained. By neutralisation with mineral or organic bases the corresponding salts of the cyclic necleotide can be obtained.

b. The $N^6$-monoethyl, $N^6$-n-butyl and $N^6$-tert. butyl derivatives of cyclo AMP have been prepared in a similar manner.

Table II indicate some of the characteristics of these various derivatives.

TABLE II $N^6$-substituted derivatives of cyclo AMP

| Substituents $N^6$ | $\lambda$ max | $\epsilon$max | $R_f$ in various solvents | | |
|---|---|---|---|---|---|
| | | | A. | B. | C. |
| monomethyl | 270 | 17000 | 0.58 | 0.49 | 0.75 |
| dimethyl | 274 | 20000 | 0.88 | 0.78 | 0.76 |
| n-butyl | 269 | 18200 | 0.75 | 0.83 | 0.82 |
| t.-butyl | 272 | 18200 | 0.70 | 0.80 | 0.83 |

The solvent systems used are the same as in Table I
The measurements of $\lambda$max and $\epsilon$max are effected at pH 7.0.

EXAMPLE 9

2'-O-butyryl-iso-adenosine-3',5'-phosphoric acid (2'-O-butyryl-cyclo-iso-AMP)

The known preparation of iso-adenosine-3',5'-phosphoric acid (cyclo-iso-AMP) includes a fraction in the column of DEAE-cellulose which provides the cyclic nucleotide in the form of its triethylammonium salt. This salt, carefully dried, (25 mg) is dissolved in 0.75 ml of anhydrous pyridine. There is added 0.375 g of butyric anhydride and the mixture is allowed to stand for 6 hours at ordinary temperature. The major part of the pyridine is removed by evaporation under vacuum; the excess butyric anhydride is then decomposed by addition of 0.35 ml of water at 0°. It is evaporated to dryness under a high vacuum. The residue is maintained for a further 12 hours under high vacuum at ordinary tempreature. It is taken up in 10 ml water and poured onto a column of DEAE-cellulose 15.5 cm long and 0.8 cm diameter. It is washed first with 300 ml water and elution effected at different concentration levels by the gradual addition to the water of 0.1M triethyl ammonium bicarbonate. Fractions of 20 ml are recovered. The monobutyrylated derivative is contained in fractions Nos. 56 to 78, which are combined and lyophilised. The residue is taken up in 0.2 ml of anhydrous methanol; there is added 1 ml of a 0.5 M solution of sodium perchlorate in anhydrous acetone and the precipitation of the sodium salt of 2'-O-butyryl cyclic iso-AMP is completed by addition of 5 ml anhydrous acetone, the salt recovered by centrifuging and washed with anhydrous acetone. There is obtained 13 mg; $\gamma_{max}$=278 m; $\epsilon_{max}$=12800; $R_f$ 0.80 in the system ethanol/ammonium acetate 0.5 M (5:2 by volume) on No. 1 Whatman paper. The maximum observed in the UV spectrum is practically identical with that of the spectrum of the initial cyclo iso-AMP, which does not include in $N^6$ the butyryl residue. The latter then can only be in 2' position. The same product is obtained if the duration of the reaction of the iso-AMP with the butyric anhydride in the presence of pyridine is prolonged to 8 days, which shows the low reactivity of the amino $N^6$ group.

EXAMPLE 10

Cyclo $N^6$-n-butyl-adenosine-3',5'-phosphoric acid ($N^6$-n-butyl-cyclo-AMP)

175 mg of $N^6$-n-butyl-adenosine-5'-phosphoric acid ($N^6$-n-butyl-AMP) prepared according to Example 3 is transformed into the triethylammonium salt which is carefully dried. It is dissolved in 10 ml of anhydrous dimethylformamide. The solution is introduced, drop by drop, during 2 hours, into 10 ml of an equal volume mixture, at boiling point, of dimethyl formamide and anhydrous pyridine the mixture containing 180 mg of DCHC. It is heated for 1 hour under reflux and is stirred continuously throughout the operation.

After evaporation to dryness under vacuum, it is taken up in 50 ml water. It is filtered to remove the precipitated dicyclohexyl urea and the solution is extracted twice with 20 ml ether to eliminate the DCHC. The aqueous solution is then poured onto a column (40 cm high and 2.8 cm diameter) of DEAE - cellulose in its bicarbonated form. After washing the column with 500 ml of twice-distilled water, elution is effected at different concentration levels by the gradual addition to the water of 0.1M triethyl ammonium bicarbonate. A total of 2 litres of mixture is employed. Fractions of 20 ml are recovered.

The cyclic nucleotide is contained in tubes Nos. 60 to 81. Their content is evaporated to dryness under vacuum, two lots of anhydrous methanol are added to the residue and driven off under vacuum. The residue is taken up in 1.5 ml of absolute methanol. The sodium of the cyclic nucleotide is precipitated by the addition of 20 ml of a 0.125 M solution of sodium perchlorate in anhydrous acetone. The solid (100 mg) is recovered by centrifuging and washing several times with anhydrous acetone.

The salt corresponds to the empirical formula $C_{14}H_{19}N_5O_6PNa$ and the corresponding acid (prepared as described later) possess all the characteristics indicated above for $N^6$-n-butyl cyclo AMP.

EXAMPLE 11

Guanosine-3′,5′-phosphoric acid (cyclo GMP)

150 g of GMP in the form of the free acid are dissolved in 25 ml of dimethyl formamide. In the space of 2 hours the solution is introduced, drop by drop, into a boiling mixture of 50 ml pyridine, 50 ml anhydrous di-methyl formamide and 170 mg of DCHC. It is heated for 2 hours under reflux. It is stirred continuously throughout the operation.

After evaporating to dryness under vacuum, it is taken up in 25 ml water, filtered and extracted 3 times with 15 ml of ether. The aqueous solution is evaporated to dryness under vacuum.

Besides the cycle GMP, the residue contains a substance which is actually guanosine-$N^2$,5′-phosphoric acid. To hydrolyse the phosphamidic linkage it is taken up in 10 ml of 0.2 N caustic soda and heated to 60° for 45 minutes.

After neutralisation with acetic acid, it is poured onto a column (40 cm high and 2.8 cm diameter) of DEAE-cellulose. The column is washed with 300 ml of water and elution at different concentration levels effected by means of water to which is gradually added 0.1 M triethyl ammonium carbonate. A total of 3 litres of the mixture is employed. Fractions of 20 ml are recovered.

Fractions Nos. 40–64, which contain the cycle GMP are evaporated to dryness under vacuum. It is taken up in anhydrous methanol and evaporated to dryness three times. It is then taken up in 1 ml of anhydrous methanol and the cyclo GMP is precipitated in the form of its sodium salt (38 mg) by addition of 12.5 ml of a 0.1M solution of sodium perchlorate in anhydrous acetone. The product is recovered by centrifuging and is washed with anhydrous acetone. It has the empirical formula $C_{10}H_{11}N_5O_7PNa.H_2O$. By its various characteristics (UV and IR spectra and $R_f$ in various solvents) it is shown to be identical with authentic cyclo GMP.

The unchanged or regenerated GMP is recovered by washing the column with 0.15 M triethylammonium bicarbonate. Its triethylammonium salt can then be subjected to the series of operation indicated for transformation into cyclo GMP, which makes it possible to increase the total yield.

The Examples which follow concern the preparation of new derivatives of cyclo AMP.

For those which carry a substituent in 8 position the synthesis can be effected starting either from non-cyclo AMP or cyclo-AMP. The intermediate product in both cases is the 8-brominated derivative. The halogen of this derivative is sufficiently mobile if treated by nucleophilic substituents. It can thus be replaced by an amino, sulphhydryl, methylthio or hydroxyl group.

The principles of the synthesis indicated above are illustrated by the following Examples.

EXAMPLE 12

8-Bromo-adenosine-3′,5′-phosphoric acid (8-bromo cyclo AMP)

a. from cyclo AMP 500 mg of cyclo AMP are dissolved in 0.75 ml of N caustic soda. After addition of 15 ml of saturated bromine water, it is left for 6 hours at ordinary temperature. It is then stirred with 10 g of active carbon, specifically norite washed first with a mixture of ammonia: ethanol: water (15:60:25 by volume) then with hydrochloric acid and water, filtered and the carbon washed with water until free from Br⁻ions. It is then eluted by stirring with a mixture of ammonia, ethanol and water (15:60:25). The solution is evaporated to dryness under vacuum and the residue is taken up in water.

This solution is poured onto a column (40 cm high and 2.8 on diameter) of DEAE-cellulose in its bicarbonated form. The column is washed first with 500 ml water. It is then eluted at different concentration levels by means of the gradual addition to the water of 0.1M triethylammonium bicarbonate. A total of 3 litres of mixture is employed. Fractions of 20 ml are recovered.

The fractions Nos. 35 to 60 are combined and evaporated to dryness under vacuum. The residue is taken up in methanol and evaporated three times. To finish it is taken up in 5 ml water and acidified to pH 2.5 which induces the crystallisation of the product. Two volumes of alcohol are added and the mixture allowed to stand at 0° for 24 hours. The solid is then recovered by centrifuging and washed twice with 5 ml of absolute alcohol and then dried. There is thus obtained 410 mg (yield 67 percent). The sodium salt has the empirical formula $C_{10}H_{10}N_5O_6PBrNa$.

b. from 8-bromo AMP

The 8-bromo AMP is prepared according to the method of Ikehara, Uesugi and Kaneko, Chem. Commun. 1. 17 (1967). The cyclisation is effected according to the method of Smith, Drummond and Khorana J. Amer. Chem. Soc. 83, 698 (1961).

170.4 mg of 8-bromo AMP (0.4 m.mole) are dissolved in 10 ml of pyridine containing 2 ml water. 117.6 mg of 4-morpholine-N.N′-dicyclohexyl carboxamidine (0.8 m mole) is added. The solution is evaporated to dryness under vacuum. The residue is taken up in 20 ml of anhydrous pyridine and again evaporated to dryness. This operation is repeated twice to eliminate the water completely. The product is finally dissolved in 20 ml of anhydrous pyridine and introduced drop by drop over an hour and a half into a solution of 165 mg of dicyclohexylcarbodiimide in 40 ml of pyridine heated to boiling. It is maintained for 2 further hours at boiling reflux. The solution is then evaporated to dryness under vacuum. The residue is taken up in 20 ml water; after filtration it is extracted three times with 20 ml ether. Fractionation is effected as in the foregoing example after having poured the solution onto a column (20 cm high and 1.2 cm diameter) of DEAE-cellulose. The 8-bromo cyclo AMP obtained (121 mg) possesses the same properties as the product prepared under (a). The yield may be improved if the cyclisation is effected in the presence of dimethyl formamide (see Example 10).

EXAMPLE 13

8-thio-adenosine-5′-phosphoric acid (8-thio-AMP) and 8-thio-adenosine-3′,5′-phosphoric acid (8-thio cyclo AMP)

In this Example, as in the three following, the 8-bromo AMP and the 8-bromo cyclo AMP are treated by nucleophilic reactants with elimination of the halogen and substitution of other groups.

a. 8-thio AMP.

500 mg of 8-bromo AMP, well pulverised, are suspended in 50 ml of 90 percent ethyl alcohol: 200 mg of thiourea are introduced and the mixture heated for 6 hours to reflux boiling with continuous stirring. The starting material has then completely disappeared. The product is neutralised with triethylamine and fractionated on a column of DEAE-cellulose under the conditions described above. The 8-thio AMP is only eluted if the concentration of triethylammonium bicarbonate is raised from 0.1 to 0.2M. Tubes 120 to 150 contain the desired product. The procedure described above is followed. The product is crystallised by dissolving in 1 ml water, adjusting the pH to 2.5 and adding 2 ml of absolute ethyl alcohol. There is obtained 250 mg (yield 52 percent). It has the empirical formula $C_{10}H_{14}N_5O_7PS$.

b. 8-thio-cyclo-AMP

The method of substitution employed in the case of 8 bromo AMP is shown to be inapplicable to 8-bromo cyclo AMP. Finally there has been employed the method used in other cases by Holme and Robins (J. Amer. Chem. Soc. 86, 1243, (1964)).

Hydrogen sulphide is mixed at low temperature in 20 ml of a 1M. alcoholic solution of sodium ethylate to obtain sodium sulphydrate. The excess hydrogen sulphide is then removed by heating to boiling. There is then introduced 100 mg of 8-bromo cyclo AMP and the mixture heated to boiling under reflux for 5 hours. After neutralisation with acetic acid it is evaporated to dryness under vacuum, taken up in 10 ml water and fractionated under the usual conditions on a column (30 cm high and 1.2 cm diameter) of DEAE-cellulose. The product is eluted only by 0.1 M triethylammonium bicarbonate; it is found in fractions Nos. 80 to 110. After the usual treatment it is obtained in a crystalline condition by lowering the pH to 2.5; it is recrystallised from ethyl alcohol. There is thus obtained 52 mg (yield 58 percent). The substance has the empirical formula $C_{10}H_{12}N_5O_6PS$.

EXAMPLE 14

8-Methylthio-adenosine-3',5'-phosphoric acid (8-thiomethyl-cyclo AMP)

100 mg of 8-bromo AMP is suspended in a 1M solution of sodium methyl mercaptate in absolute alcohol and heated to boiling under reflux for 6 hours. It is then neutralised with acetic acid and evaporated to dryness under vacuum. The residue is taken up in 50 ml water; the pH is adjusted to 3 and the nucleotide is absorbed, with agitation, on 3 g of active carbon. This is washed with water and eluted by treatment with a mixture of ethanol, concentrated ammonia and water (60:15:25 by volume). The solution is evaporated to dryness under vacuum and the residue taken up in 10 ml of water. It is then fractionated under the usual conditions on a column (50 cm high and 1.2 cm diameter) of DEAE-cellulose. The desired product is found in fractions Nos. 45 to 60 (it is necessary to observe the UV spectrum tube by tube to effect a separation from two other, non-identified, products). The triethylamine salt contained in these fractions is transformed into a sodium salt in the manner earlier described. There is obtained 36 mg (yield 40 percent)

The substance has the empirical formula $C_{11}H_{12}N_5O_6P\ SNa$.

EXAMPLE 15

8-Hydroxy-adenosine-3',5'-phosphoric acid (8-hydroxy cyclo AMP)

225 mg of anhydrous, freshly melted, sodium acetate is dissolved in 7.5 ml of glacial acetic acid; 150 mg of 8-bromo cyclo AMP is added in the form of the free anhydrous acid. It is plunged in a bath heated to 135° and heated for 2 hours boiling at reflux (at the end of 15 minutes the nucleotide is completely dissolved). The solution is then evaporated to dryness and the residue is taken up in 10 ml water.

Fractionation on a column of DEAE-cellulose is effected under the usual conditions. The desired product is found in fractions Nos. 50 to 70; these are combined and evaporated to dryness under vacuum. The trimethylammonium salt present is transformed into a sodium salt under the conditions already described; there is obtained 85 mg (yield 66 percent). The product corresponds to the empirical formula $C_{10}H_{10}N_5O_7PNa$.

EXAMPLE 16

8-Amino-adenosine-5'-phosphoric acid (8-amino AMP) and 8-amino-adenosine-3',5'-phosphoric acid (8-amino-cyclo AMP)

436 mg of 8-bromo AMP are dissolved in 2.5 ml of formamide; 10 ml of methanol saturated with ammonia is added. The mixture is heated in a sealed tube at 87°–92° for 48 hours. The methanol is evaporated, 10 ml water is added and the product is fractionated under the usual conditions on a column of DEAE-cellulose. The desired product is obtained in fractions 50 to 70. These are combined and evaporated to dryness under vacuum. The 8-amino AMP is accompanied in the crude mixture by two compounds giving minor peaks and of which one is difficult to separate from the main product. This last is nevertheless usable for the following procedure although it does not give the correct figures and analysis. The yield obtained is 70 percent based on the quantity of phosphorus recovered.

176 mg of the well-dried triethyl ammonium salt of the 8-amino AMP are dissolved in a mixture of 25 ml of pyridine and 5 ml of water. There is added 146 mg of 4-morpholino-N,N'-dicyclohexylcarboxamidinium with the object of transforming the nucleotide into a soluble salt. The product is evaporated to dryness under vacuum, taken up in 25 ml pyridine and again evaporated to dryness: this operation is repeated twice. Finally the residue is dissolved in 50 ml pyridine. Cyclisation in the presence of 202 mg of dicyclohexylcarbodiimide dissolved in 50 ml pyridine is effected as described in Example 3(b). The reaction product is fractionated on a column of DEAE-cellulose under the usual conditions. The desired product is found in fractions Nos. 50 to 65, which are combined and evaporated to dryness under vacuum. The product is transformed into a sodium salt under the conditions already described.

There is obtained 56 mg (Yield 32 percent). This yield can be increased by using dimethyl formamide in the cyclisation (Example 1). The product has the empirical formula $C_{10}H_{12}N_6O_6P\ Na$.

EXAMPLE 17

2-amino-adenosine-3',5'-phosphoric acid (2-amino cyclo-AMP)

The principle of the synthesis is as follows:

The starting material is 2-amino-6-chloro-9(2',3',5'-triacetyl-β-D-ribofuranosyl) purine which is prepared from guanosine. The acetyl groups are removed by ammonolysis. The 2-amino-6-chloro-9(β-D-ribofuranosyl)purine is treated under more energetic conditions with ammonia, which yields 2-amino-adenosine. The product is transformed into a 2',3'-isopropylidene derivative which, by phosphorylation, by means of phosphorus oxychloride in the presence of pyridine and formic acid (compare Asahi Chemical Industry Co. Ltd., French Patent No. 1531156) yields 2-amino-AMP. This last, by cyclisation in the presence of DCHC and dimethyl formamide (compare Example 2) finally yields 2-amino cyclo-AMP. The three last products are novel and form part of the invention.

The 2-amino-6-chloro-9(2',3',5'-triacetyl-β-D-ribofuranosyl)purine is prepared, starting from guanosine, as described by Gerster, Lewis and Robbins, "Methods in Nucleic Acids Chemistry" 1, 242. The product is treated, for 14 hours at ordinary temperature with a saturated solution of ammonia in methanol to deacetylate bit. It is evaporated under vacuum and recrystallised from methanol.

The replacement of chlorine by an amino group necessitates very energetic conditions. 200 mg of the foregoing product is heated for 48 hours in an autoclave at 120° with 50 ml of concentrated ammonia, Crystals of 2,6-diamino-nucleotide are deposited after cooling (Yield 55 to 65 percent, are recovered, washed with alcohol and water, and dried.

This product has previously been prepared by a different method but the process of the invention is more practical.

1.3 g of the foregoing compound is suspended in 220 ml acetone; 52 ml of dimethoxy propane and 9.2 g of p-toluene sulphonic acid monohydrate are added, and stirring effected at ordinary temperature. After dissolution of the nucleoside, the p-toluene sulphonate of the isopropylidene derivative precipitates. After an hour the salt is recovered by centrifuging and washed with acetone. It is decomposed by heating it with 40 cc of 10 percent sodium bicarbonate. After complete dissolution and evaporation to dryness under vacuum, the residue is dried by addition of 50 cc of benzene followed by evaporation, three times. It is extracted with 150 ml, in total, of chloroform and evaporated to dryness. It is dried again by addition of 150 ml of benzene followed by evaporation, twice. The residue is dissolved in the minimum quantity of chloroform and precipitated by addition of excess benzene. 1.2 g of the amorphous, chromatographically homogenous, product is obtained.

For the phosphorylation, the foregoing substance (1.1 g) is introduced into a mixture of 3.5 ml acetonitrile, 1.74 ml of phosphorus oxychloride, 0.46 ml of anhydrous formic acid and 1.5 ml of anhydrous pyridine. The mixture is stirred to dissolution in a cold room and allowed to stand at 3° to 4° for 2 hours. There is then introduced, slowly, at 0°, 35 ml water, the mixture is stirred for 2 hours at 0° and the pH adjusted to 1.5 by means of sodium hydroxide. It is then warmed at 70° for 1 hour to eliminate the isopropylidene groups and then stirred with 16 g of active carbon. The latter is washed with water. The absorbed nucleotide is eluted by means of a mixture of ethanol, concentrated ammonia and water (60:15:25 by volume). It is then fractionated on a column of DEAE-cellulose at different concentration levels by means of 0.35 M ammonium bicarbonate gradually added to the water. The 2-amino-AMP is contained in fractions Nos. 100 to 140. Its triethylammonium salt isolated under the usual conditions is used directly for the following procedure (the quantity of phosphorus present corresponding to 640 mg of the salt).

The cyclisation is effected using 400 mg of triethylammonium salt of 2-amino-AMP dissolved in 5 ml water. After addition of 360 mg of 4-morpholino-N,N'-dicyclohexyl-carboxamidine, the procedure is as described in Examples 1 and 2 using 510 mg of DCHC and 50 ml of dimethyl formamide. By paper chromatography there is revealed, besides the desired product, another compound migrating more rapidly which may be, perhaps, (see Example II) 2-amino-adenosine-$N^2,5'$-phosphoric acid. After evaporation to dryness under vacuum the crude mixture is treated for 1 hour at 60° with 50 parts of 0.1N sodium hydroxide. The product is neutralised with acetic acid and fractionated under the usual conditions on a column of DEAE-cellulose. The product is finally converted into a sodium salt in the manner indicated. There is obtained 106 mg. The product has the empirical formula $C_{10}H_{12}N_6O_6P$ Na.

As indicated above the silver salts can be precipitated from concentrated aqueous solutions of the sodium salts of the nucleotides of the invention, the free acids can be obtained by decomposition of the silver salts by means of hydrogen sulphide and then, by neutralisation by means of mineral or organic bases the corresponding salts. Further, all the compounds are susceptible to acylation in $N^6$ or 2'-0 positions and also in $N^8$, 8-O, 8-S and $N^2$ positions. In particular, treatment with butyric anhydride in the presence of pyridine yields derivatives butyrylated in $N^6$ and 2'-O and, also in 8-O, 8-S, $N^8$ and $N^2$ positions. These compounds are of interest because the $N^6$, 2'-O-dibutyryl-cyclo-AMP shows in many in vivo tests an action superior to that of the nucleotide base.

EXAMPLE 18

$N^6$, 2'-O-dibutyryl-8-thio cyclo AMP 75 mg of 8-thio-cyclo AMP are suspended in a mixture of 2.5 ml anhydrous pyridine and 1.25 ml butyric anhydride. It is stirred for 3 hours to complete solution and allowed to stand at ambient temperature for 20 hours. A solution is cooled to −10° and there is carefully added 1.5 ml of ice-water. After 3 hours standing at ambient temperature it is evaporated to dryness under high vacuum, and maintained under this vacuum for 24 hours. It is taken up in 5 ml water and fractionated on a column of DEAE-cellulose under the conditions indicated above. The fraction containing the butyrylated derivative is evaporated to dryness; it is co-evaporated several times with anhydrous methanol and taken up in 2 ml ethanol. The theoretical quantity of barium iodide in 1 ml alcohol (based on the phosphorus content of the solution: for 1 atom P, ½ ml of $BaI_2$ is necessary is added. The barium salt precipitates after some time and is recovered by centrifuging and washed with a little alcohol: 29 mg of the product is obtained: a considerable quantity of the product remaining in the mother liquors can be recovered in a less pure form by addition of 2 to 3 volumes of anhydrous ether. The product has the empirical formula $C_{18}N_{23}N_5O_8PS.Ba/2$.

From its composition and IR spectrum the product contains only 2 butyryl groups which are doubtless in $N^6$ and 2'-O positions. The sulphydryl group in $C^8$ has not reacted which is explained by the fact that it is completely in the tautomeric form of the thio-ketone.

Some characteristics of these derivatives of cyclo-AMP carrying substituents in 2 or 8 positions are indicated in the following table.

McKenzie -percentage increase of the radio activity of blood in units, measured per minute and per ml of blood, after 2 hours, Response -response calculated by covariance after conversion to decimal logarithms.

Dunnet

Signif. Stat. Statistical significance:

n.s: insignificant; + significant (p = 0.05); ++ very significant (p = 0.01)

TSH mU milli-units of thyreotrope hormone
mg.hyp. per mg hypophysis

TABLE

| Treatment | Dose in milli-moles | Response according to McKenzie | Response Covar. | Dunnet | Signif. stat. | TSHmU total | TSHmU mg/hyp. |
|---|---|---|---|---|---|---|---|
| Control | — | 140% | 2.31 | — | — | 30.0 | 2.94 |
| AMP (c) | 5 | 316% | 2.59 | 4.53 | x x | 76.5 | 5.71 |
| di-methyl-AMP(c) | 3 | 298% | 2.62 | 4.94 | x x | 70.5 | 5.73 |
| mono-methyl-AMP(c) | 3 | 250% | 2.54 | 3.66 | x x | 54.0 | 4.20 |
| Control | — | 137% | 2.25 | — | — | 20.0 | 1.90 |
| AMP (c) | 3 | 347% | 2.66 | 5.36 | x x | 60.0 | 4.65 |
| t-butyl-AMP(c) | 1 | 186% | 2.39 | 1.81 | n. s. | 26.0 | 2.05 |
| n-butyl-AMP(c) | 1 | 302% | 2.60 | 4.57 | x x | 46.0 | 3.98 |
| mono-methyl-AMP(c) | 1 | 270% | 2.51 | 3.41 | x | 40.0 | 2.95 |
| O-butyryl-iso-AMP(c) | 1 | 275% | 2.56 | 4.13 | x x | 42.0 | 2.94 |
| Control | — | 135% | 2.00 | — | — | 20.0 | 1.69 |
| n-butyl-AMP(c) | 1 | 223% | 2.23 | 3.77 | x x | 31.0 | 2.77 |
| t-butyl-AMP(c) | 1 | 164% | 2.08 | 1.28 | n. s. | 23.0 | 1.92 |
| AMP(c) | 3 | 243% | 2.26 | 4.24 | x x | 37.0 | 3.44 |
| O-butyryl-iso-AMP(c) | 1.5 | 170% | 2.13 | 2.10 | n. s. | 24.0 | 2.00 |

| Substance | λ max | ε max | $R_f$ in two solvent media A. | B |
|---|---|---|---|---|
| 8-bromo-AMP (c) | 266 | 15200 | 0.43 | 0.63 |
| 8-thio-Amp (c) | 297[1] | 24000[1] | 0.25 | 0.40 |
| 8-methylthio AMP (c) | 280 | 18400 | 0.48 | 0.66 |
| 8-hydroxy-AMP (c) | 270 | 11500 | 0.38 | 0.48 |
| 8-amino-AMP (c) | 273 | 16000 | 0.23 | 0.32 |
| 2-amino-AMP (c) | 258 | 10200 | — | — |
|  | 282 | 10200 | — | — |
| 8-amino-AMP | 274 | 16100 | 0.05 | 0.23 |
| 8-thio-AMP | 236[1] | 25200 | 0.06 | 0.25 |
|  | 297[1] | 24100 | — | — |
| dibutyryl-8-thio-AMP | 246 | 19800 | 0.85 | 0.82 |
|  | 326 | 25500 | — | — |

A = ethanol: 0.5M ammonium acetate (5:2 by volume)
B = isopropanol : 1% ammonium sulphate (2:1 by volume)
λmax and εmax measured at pH7 unless otherwise indicated
c = cyclo
[1] = measured at pH 11.0

Biological tests

It has first been examined how the derivatives of cyclo AMP carrying alkyl substituents in $N^6$, 2'-O-dibutyryl-cyclo-AMP behave in respect of hypophysis of rats incubated according to a known technique (M. Saffran at A.V. Schally, J. Biochem. of Physiol., Canada, 33, 408, 1955).

After an hour's incubation at 38° in a Krebs-Ringer medium containing sodium bicarbonate and glucose, the hypophysis of rats which have been in the presence of the new derivatives has produced more thyreotrope hormone than the hypophysis of the control, the content in the incubation products of thyreotrope hormone after dilution being determined by the method of Mc-Kenzie (J.M. McKenzie, Endocrinology, 63, 372, 1958).

The results are set out in the following table where the abreviations at the head of the column signify respectively: Response according to It is shown by this Table that the new derivatives of cyclo AMP, save for the $N^6$-tert.butyl derivative, have given rise to significant increases in the liberation of thyreotrope hormone even at a dose of a milli-molecule whereas cyclo AMP itself has no effect at this dosage. The lower activity of the tert. butyl derivative, in this test, by comparison with the n-butyl derivative appears attributable to steric hindrance, the n-butyl radical being spread out whereas the t. butyl radical is compact.

Contrarily, in the test of the action on the melanophores of the Anolis lizard the tert. butyl derivative and the normal butyl derivative behave more similarly. The minimum concentrations which have given positive responses in this test have been as follows:

| AMP (c) | | 1 | millimole |
|---|---|---|---|
| mono methyl | derivative | 0.43 | do. |
| dimethyl | do. | 0.56 | do. |
| n-butyl | do. | 0.26 | do. |
| t-butyl | do. | 0.28 | do. |

The derivatives of adenosine-3',5'- cyclo monophosphoric acid carrying substituents in 2 and/or 8 positions have been studied in reference to the liberation in vitro of the hypophyseal growth hormone in the rat. The dosage of hypophyseal growth hormone (GH) and of prolactine (PR) have been measured by electrophoresis on gel.

The following Table indicates the results obtained. The concentrations of nucleotides are expressed in mM and the quantities of hypophyseal growth hormone liberated in the incubation media are expressed in μg/mg of hypophysis and a percentage by comparison with the control.

TABLE II

| Experiment | Dose (mM) | GH μg (2 ml) | GH μg/ mg hyp. | % by reference to control |
|---|---|---|---|---|
| A | | | | |
| Control | — | 32 | 1.07 | — |
| 8-amino-AMP(c) | 2 | 74 | 2.72 | 2.54 |
| 8-bromo-AMP(c) | 2 | 156 | 4.88 | 456 |
| B | | | | |
| Control | — | 16 | 0.75 | — |
| AMP (c) | 5 | 32 | 1.40 | 186 |
| 8-thio-AMP(c) | 2 | 92 | 4.53 | 604 |
| 8-hydroxy-AMP(c) | 2 | 56 | 2.68 | 357 |
| 8-amino-AMP(c) | 2 | 32 | 1.55 | 206 |
| C | | | | |
| Control | — | 36 | 1.29 | — |
| AMP(c) | 4 | 66 | 2.65 | 205 |
| 8-methylthio-AMP(c) | 2 | 84 | 3.31 | 256 |
| 8-thio-AMP(c) | 2 | 82 | 3.37 | 261 |
| 8-amino-AMP(c) | 2 | 54 | 2.21 | 171 |
| 8-bromo-AMP(c) | 2 | 188 | 5.68 | 440 |
| 8-Hydroxy-AMP(c) | 2 | 72 | 2.98 | 231 |
| D | | | | |
| Control | — | 23 | 0.81 | — |
| AMP(c) | 9 | 52 | 1.90 | 235 |
| AMP(c) | 3 | 30 | 0.99 | 122 |
| 2-amino-AMP(c) | 2 | 41 | 1.47 | 181 |
| 8-thio-AMP(c) | 2 | 97 | 3.56 | 439 |
| 8-bromo-AMP(c) | 1 | 53 | 1.75 | 216 |
| E | | | | |
| Control | — | 21 | 0.69 | — |
| 8-thio-AMP(c) | 1.5 | 62 | 2.19 | 317 |
| 8-hydroxy-AMP(c) | 4 | 66 | 2.34 | 339 |
| F | | | | |
| Control | — | 20 | 0.82 | — |
| 8-amino-AMP(c) | 4 | 44 | 2.01 | 245 |
| 8-hydroxy-AMP(c) | 4 | 60 | 2.34 | 285 |
| 2-amino-AMP(c) | 4 | 37 | 1.58 | 193 |
| DBC* | 2 | 75 | 3.06 | 373 |
| DBC* | 1.5 | 56 | 2.53 | 309 |
| G | | | | |
| Control | — | 28 | 1.16 | — |
| 2-amino-AMP(c) | 3 | 52 | 2.88 | 248 |
| H | | | | |
| Control | — | 16 | 0.72 | — |
| AMP (c) | 4 | 20 | 0.995 | 138 |
| 8-bromo-AMP(c) | 2 | 72 | 3.54 | 490 |
| N⁶,2'-O-dibutyryl 8-thio AMP(c) | 2 | 84 | 4.50 | 625 |

*DBC = $N^6,2'$-O-dibutyryl-cyclo-AMP.

The new derivatives of cyclo AMP described in the present application have all shown a higher activity than cyclo AMP itself in the biological study of the liberation of hormone. The 8-thio cyclo AMP, 8-bromo-cyclo AMP and above all the $N^6,2'$-O-dibutyryl-8-thio cyclo AMP have an activity superior to $N^6,2'$-O-dibutyryl-cyclo AMP (DBC).

The new derivatives of cyclo AMP may be used in industry for the same purposes as cyclo AMP, notably in biochemical, biological and pharmaceutical research.

The new derivatives are usable in research on the machanism of hormonal action. Being given that they play the role of second messenger to the hormonal action they can replace the action of the hormones themselves in the organism.

We claims as our invention:

1. Compounds having the structural formula

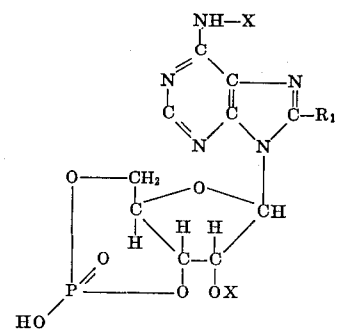

wherein X is selected from the group consisting of butyryl and H with the provisio that at least one X must be butyryl; $R_1$ is selected from the group consisting of SH, Br, OH, $SCH_3$ and $NH_2$; and their neutralization salts.

2. The compounds of claim 1 wherein the salt is a sodium salt.

3. Compounds having the structural formula

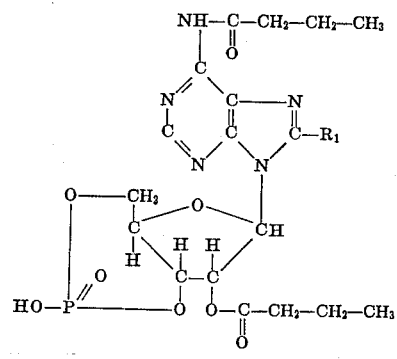

wherein $R_1$ is selected from the group consisting of SH, Br, $NH_2$, OH and $SCH_3$ and their neutralization salts.

4. Compounds of claim 3 wherein the salt is a sodium salt.

5. $N^6,2'$O-dibutyryl-8-thioadenosine 3',5'-cyclic phosphoric acid and its neutralization salts.

6. The compound of claim 5 wherein the salt is sodium.

7. $N^6,2'$O-dibutyryl-8-methylthioadenosine 3',5'-cyclic phosphoric acid and its neutralization salts.

8. The compound of claim 7 wherein the salt is sodium.

9. $N^6,2'$O-dibutyryl-8-hydroxyadenosine 3',5'-cyclic phosphoric acid and its neutralization salts.

10. The compound of claim 9 wherein the salt is sodium.

11. $N^6,2'$O-dibutyryl-8-aminoadenosine 3',5'-cyclic phosphoric acid and its neutralization salts.

12. The compound of claim 11 wherein the salt is sodium.

13. $N^6,2'$O-dibutyryl-8-bromoadenosine 3',5'-cyclic phosphoric acid and its neutralization salts.

14. The compound of claim 13 wherein the salt is sodium.

15. $N^6$-n-butyl adenosine 3′,5′-cyclic phosphoric acid and its neutralization salts.

16. The compound of claim 15 wherein the salt is sodium.

* * * * *